Oct. 24, 1967  J. R. GRAY  3,349,195
APPARATUS FOR TESTING DIGITAL-TO-ANALOG CONVERTERS
Filed May 7, 1964
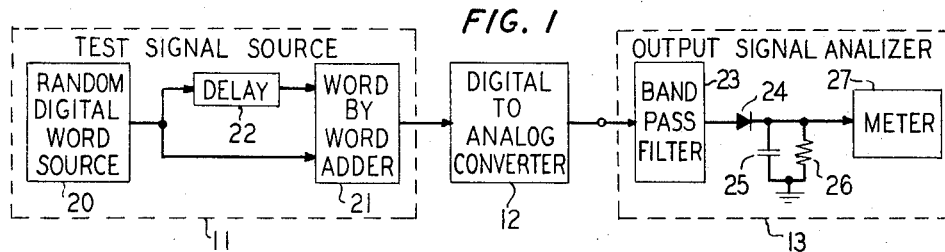
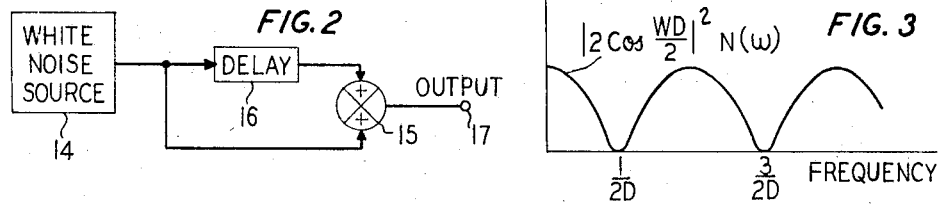
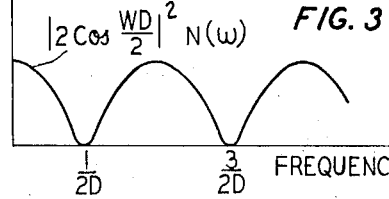
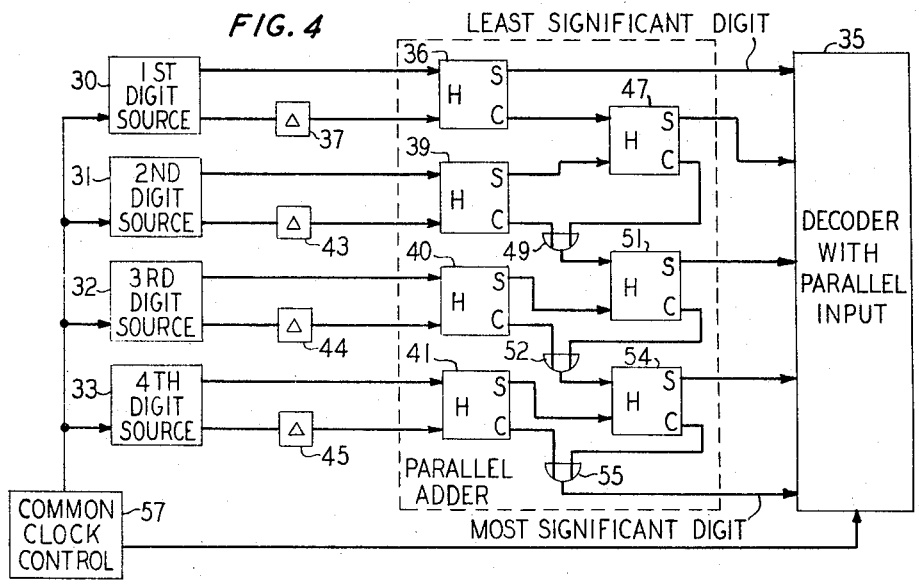
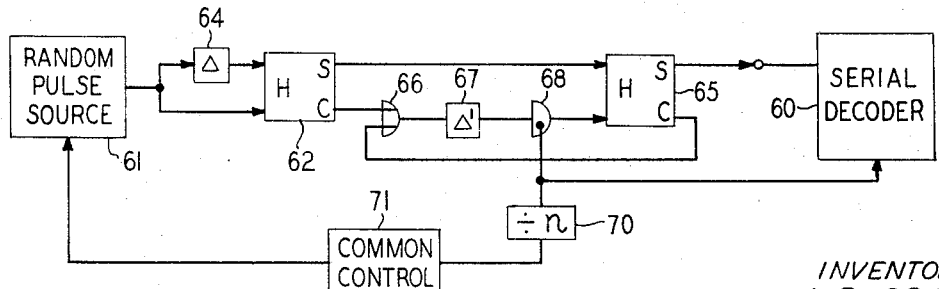
INVENTOR
J. R. GRAY
BY
ATTORNEY

United States Patent Office 3,349,195
Patented Oct. 24, 1967

3,349,195
APPARATUS FOR TESTING DIGITAL-TO-ANALOG CONVERTERS
James R. Gray, Martinsville, N.J., assignor to Bell Telephone Laboratories, Incorporated, New York, N.Y., a corporation of New York
Filed May 7, 1964, Ser. No. 365,674
4 Claims. (Cl. 179—175)

This invention relates to digital information handling systems and, more particularly, to an arrangement for testing the performance of digital-to-analog converters.

In what is perhaps the most widely used scheme for testing the operation of a receiving decoder, the associated transmitting encoder is used as the source of a digital test signal. The encoder translates a known analog waveshape into digital form and the resulting data signal is then directly supplied to the decoder for conversion back into analog form. By comparing the original analog signal with the decoded output signal, a measure of the performance of the over-all system is obtained. The difficulty with such a procedure is apparent. If poor operation is observed, it is impossible to determine whether the malfunction is being contributed by the coder or the decoder. Moreover, if the transmitting encoder is unavailable or already known to be inoperative, testing the receiving decoder by this approach is precluded.

Fortunately, an improved scheme for evaluating the performance of systems requiring digital inputs has been developed which does not require the use of the transmitting encoder. This approach, which is described in detail in U.S. Patent 3,057,972, issued to H. Mann on Oct. 9, 1962, involves the use of a digital function generator which synthesizes a digital representation of a periodic test signal, such as a sine wave, a ramp function, or the like. According to this scheme, means are employed for storing separate and predetermined code words, each of which is representative of a sample of the specified cyclical wave. These code groups are then conveyed to the decoder input at appropriate times such that, if the decoder is operating properly, the resulting analog output signal will closely resemble the specified cyclical waveshape.

While it is apparent that the testing arrangement described above possesses significant advantages over earlier testing schemes, it is not without limitations. Just as an amplifier which is to be used to amplify broadband, information carrying signals cannot be thoroughly tested with a single frequency tone, the performance of a decoder cannot be completely evaluated by merely supplying the same series of a few code words over and over again to produce a periodic analog output signal.

It is accordingly an object of the present invention to test the operation of a digital-to-analog converter by means of an essentially random digital input signal; that is, a signal which is analogous to the band-limited, white noise signal often used to such great advantage as a means for testing systems which handle analog signals.

It is a further and related object of the invention to generate a digital signal which, when decoded, will have a continuous frequency spectrum throughout the band of interest with the exception of at least one inband null.

In a principal aspect, the present invention takes the form of an improved scheme for evaluating the performance capabilities of a digital-to-analog converter. In accordance with a feature of the invention, means are employed for generating a sequence of essentially random $n$ digit binary words; that is, a pulse signal wherein not only all of the words are uncorrelated, but also the binary digits constituting a word are indepennent and probability of ON and OFF pulses is approximately equal. According to a further feature of the invention, each word is stored and then added to a word which is generated D seconds later to produce a sequence of modified words. Since the original words have a uniform probability density over the decoded amplitude range 0 to $2^n-1$, the probability density of the modified words is triangular over the range 0 to $2(2^n-1)$ with maximum probability occurring at $(2^n-1)$. These modified words are then supplied to the input of the decoder which is to be tested and the resulting analog output signal is observed. In accordance with the invention, means are employed for measuring the magnitude of at least one of those frequency components which exist at odd multiples of $1/2D$ cycles per second in the spectrum of the decoded output signal. According to the invention, if substantial signal components are observed at these frequencies (where there should be nulls), the decoder is known to be operating poorly.

These and other objects, features, advantages of the present invention will be more clearly understood by considering the following detailed description. In the written text of the description, reference will be made to the attached drawings in which:

FIG. 1 illustrates a simplified embodiment of the invention in block-diagram form;

FIG. 2 shows an analog circuit whose operation illustrates a principle which underlies the operation of the present invention;

FIG. 3 is a graph showing the frequency spectrum of the signal developed by the circuit of FIG. 2;

FIG. 4 shows a more detailed embodiment of the present invention wherein the digital test signal is generated in parallel fashion; and FIG. 5 illustrates still another embodiment of the invention wherein the digital test signal is developed in serial fashion.

A simplified embodiment of the present invention is illustrated by FIG. 1 of the drawings which shows a digital test signal generator 11, the digital-to-analog converter 12, and an output signal analyzer 13. The source 11 supplies a digital test signal to the converter 12 which is to be tested. The analyzer 13 measures the magnitude of at least one frequency component of the decoded signal. If the converter 12 is operating properly, nulls should be observed at selected frequencies in the decoded output signal.

Before considering the details of the circuit shown in FIG. 1, however, it will be instructive to first consider the arrangement shown in FIG. 2 of the drawings. In this arrangement, which is analogous to the digital system of FIG. 1, a "white noise" source 14 is shown which generates a Gaussian noise signal having uniform frequency content throughout the band of interest. The output of the source 14 is connected to one input of an adder 15 in a direct manner and to the other input of adder 15 through a delay line 16. The combined effect of adder 15 and the delay line 16 is to add the noise signal from source 14 to a delayed version of itself and to deliver the sum to the output 17.

It should be apparent that those frequency components of the noise signal which have a period equal to a multiple of the delay time of the delay line 16 will be applied in phase to adder 15 and will add constructively. In contrast, those frequency components which have a period equal to an odd multiple of half the line's delay time will cancel in the adder, thereby producing nulls in the spectrum of the signal appearing at output 17. The resulting power spectrum of the output signal is depicted by FIG. 3 of the drawings and is given by the relation $$G_{(\omega)} = 4 \left[ \cos^2 \frac{\omega D}{2} \right] N(\omega)$$

where $G_{(\omega)}$ is the spectral density as a function of frequency, "$\omega$" is the frequency in radians per second, and "$D$" is the delay time of the delay line 16 in seconds.

N(ω) is the power spectral density of the noise source. In accordance with the invention, principles generally similar to the foregoing are applied to a digital system.

The digital test signal source 11 shown in FIG. 1 also uses this combination of delay and addition to produce a signal which, once properly decoded, becomes a signal having nulls in its frequency spectrum. As shown in FIG. 1, however, it is the digital signal which is delayed and added to itself on a word-by-word basis. The binary word source 20 develops a sequence of digital words which are essentially random; that is, all of the digits comprising a word are independent and are equally likely to be either "ones" or "zeros"; also successive words are uncorrelated. These words are supplied to one input of the adder 21 directly and to the other input through the delay device 22. These are binarily added in the word-by-word adder 21 to produce a sequence of modified words, each of which includes one more digit (the "carry" digit) than an input word.

This sequence of modified words is then supplied to the input of the digital-to-analog converter 12 which is to be tested. As may be appreciated, if the analog-to-digital translation is made correctly, the analog signal delivered from the decoder 12 should have nulls in its frequency spectrum. These nulls, like those produced by the arrangement of FIG. 2, appear at those frequencies which have a period equal to an odd multiple of half the delay time of the delay device 22. In the event the converter 12 is not operating properly, however, substantial signal components will appear at these null frequencies.

An output signal analyzer 13 as illustrated in FIG. 1 may be used to measure signal components existing at one or more of the null frequencies. Analyzer 13 includes a bandpass filter 23 tuned to pass null frequency components with minimum attenuation yet exclude other components. A peak detector comprising diode 24, capacitor 25 and resistance 26 converts the signal from filter 23 into a DC voltage which is measured by meter 27. Meter 27 may, of course, be precalibrated for the proper low reading when a given decoder is operating correctly. Any substantial increase from this reading will accordingly indicate that the decoder being tested is marginal or operating incorrectly.

FIG. 4 of the drawings illustrates digital test signal generator according to the invention wherein the random digits are generated and added in parallel fashion. For purposes of illustration, means for testing a five-digit decoder are shown. The random digits are initially produced by four independent single digit generators 30 through 33 such that, with the additional carry digit produced during the adding process, essentially random, five-digit words are delivered to the input of the decoder 35. Each output digit from source 30 is supplied directly to the first input of the half-adder 36 and to the second input through delay device 37. The sum digit output from half-adder 36 constitutes the first input digit to decoder 35.

Half-adder 36, like the other half-adders to be discussed, operates as follows: If both input digits are the same, a "0" is delivered to the sum output "s"; if the two inputs are different, a "1" is delivered to the sum output "s"; and a "1" is delivered to the carry digit output "c" when and only when both input digits are "1's."

The random digits from sources 31, 32, and 33 are supplied directly to the first input of half-adders 39, 40, and 41, respectively, while the second inputs of each are connected by delay devices 43, 44, and 45, respectively. The sum digit from half-adder 39 is supplied along with the carry digit from half-adder 36 to the two inputs of a half-adder 47. The sum output digit from half-adder 47 constitutes the second input digit to decoder 35. The carry digit from half-adder 47 is conveyed, along with the carry digit from half-adder 39, to the two inputs of an OR-gate 49. The digit from OR-gate 49 is then combined with the sum digit from half-adder 40 in a further half-adder 51 whose sum digit output supplies the third digit to decoder 35. The carry digits from half-adders 40 and 51 are supplied to the input of OR-gate 52 whose output is connected one input of half-adder 54. The other input to half-adder 54 is taken from the sum output of half-adder 41 such that the sum output from half-adder 54 provides the fourth digit to the decoder 35. The fifth and final digit is supplied by the output of an OR-gate 55 whose inputs are connected to the carry outputs of half-adders 41 and 55. A common clock source 57 provides timing signals to both the digit sources 30 through 33 and the decoder 35.

In operation, the circuit shown in FIG. 4 adds each four-digit input word from the sources 30 through 33 to another word which was generated one or more words earlier. Accordingly, the delay times of the delay devices 37, 43, 44, and 45 should be a selected multiple of the clock pulse interval. When properly decoded, the resultant five-digit signal supplied to decoder 35 will result in an analog signal having the desired nulls.

The diagram shown for the parallel adder has been drawn in functional blocks to aid in the understanding of the adding process contemplated. Actual components and circuits for performing the desired adding process, such as specific half-adders and OR-gates, as well as other functional configurations which may be used are well known in the art and are discussed in detail, for example, in Chapter 4, "Arithmetic Operations in Digital Computers" by R. K. Richards, D. Van Nostrand (1956).

FIG. 5 of the drawings shows a further illustrative embodiment of the invention wherein the digits are generated from a single random source and added serially. This form of test signal generator is used to test decoder 60 which is adapted to process digital words which occur least significant digit first. Alternately an appropriate serial-parallel converter could be used between the adder output and the input to a parallel decoder.

Those pulses which are to be processed to form the desired digital test signal are obtained from the random pulse source 61. Here it will be well to note that the creation of nulls does not rely on the randomness of the source. Any pulse signal translated in accordance with the invention will take on the desired characteristic of having nulls in the spectrum of the decoded output signal. Greater randomness of the original digital signal does, however, insure a more complete evaluation of the digital-to-analog translation apparatus; i.e., a more suitable distribution of code levels at the decoder input. One convenient scheme for generating random pulses which may be employed in some applications involves the use of the associated transmitting encoder to encode a band-limited analog noise signal.

As shown in FIG. 5 the train of random pulses from source 61 is applied to one input of a half-adder 62 directly and to the other input of adder 62 through delay unit 64. The sum digits from half-adder 64 are applied to one of the inputs of a further half-adder 65. The carry digits from half-adder 62, however, are conveyed to one input of OR-gate 66 whose other input is connected to receive carry digits from half-adder 65. The output signal from OR-gate 66 is delayed one digit positon by delay unit 67 and then supplied to the other input of half-adder 65 through an INHIBIT gate 68. INHIBIT gate 68 is adapted to prevent the feedback carry digit from a given word from influencing the determination of the least significant digit of the next word presented to decoder 60. For this purpose, the inhibit input of gate 68 is connected to a counter 70 which divides the common clock pulses by "n," the number of digits per word, to inform both the adding circuitry and the decoder 60 when a new word is to begin. Clock 70 also provides timing signals to the random source 61.

It is to be understood that the embodiments which have been described above are merely illustrative of an application of the principles of the invention. Depending on the type of digital-to-analog converter to be tested, the type of random pulse sources available, and other design considerations which may exist in a specific case, numerous modifications may be made to the embodiments disclosed without departing from the true spirit and scope of the invention.

What is claimed is:

1. Apparatus for testing the operation of a digital-to-analog converter which comprises, in combination, a source of a first binary pulse train, means for adding said pulse train to a delayed version of itself to form a sum, means for applying said sum to the input of said converter, and means for meauring the frequency characteritics of the analog signal appearing at the output of said converter.

2. In combination, a source of a first sequence of essentially random $n$-digit binary code words, means connected to said source for delaying said first sequence to form a delayed sequence, a word-by-word adder for binarily combining said first sequence and said delayed sequence to form a sum sequence of $n+1$ digit binary code words, a decoder having an input and an output, means for supplying said sum sequence to said input, and means for measuring the frequency characteristics of the analog wave form appearing at said output.

3. In combination, a source of a first series of pulse groups, means for delaying said first series by D seconds to form a second series of delayed groups, means for digitally adding said first series to said second series group by group to form a third series of sum groups, a digital-to-analog converter having an input and an output, means for supplying said sum groups to said input, and means connected to said output for measuring the magnitude of electrical energy existing at an odd multiple of $1/20D$ cycles per second in the analog signal appearing at said output.

4. In combination, means for generating a sequence of substantially random binary pulse code words, means for forming the binary sum of each of said words as it is generated and another of said words which was generated D seconds earlier to form a sequence of modified words, a decoder having an input and an output, means for supplying said modified groups to said input, and means connected to said output for measuring the magnitude of at least one component of the decoded analog signal appearing at said output which exists at an odd multiple of $1/2D$ cycles per second.

No references cited.

KATHLEEN H. CLAFFY, *Primary Examiner.*

A. McGILL, *Assistant Examiner.*